United States Patent [19]

Dy et al.

[11] Patent Number: 5,426,543
[45] Date of Patent: Jun. 20, 1995

[54] SERVO POSITIONING SYSTEM FOR MAGNETIC RECORDING MEDIA

[75] Inventors: Bennett G. Dy; Richard W. Molstad, both of St. Paul; Robert J. Youngquist, White Bear Lake, all of Minn.

[73] Assignee: Minnesota Mining and Manufacturing Company, St. Paul, Minn.

[21] Appl. No.: 194,752

[22] Filed: Feb. 10, 1994

Related U.S. Application Data

[60] Continuation of Ser. No. 741,677, Aug. 7, 1991, abandoned, which is a division of Ser. No. 712,346, Jun. 7, 1991, Pat. No. 5,229,895.

[51] Int. Cl.⁶ .................. G11B 5/584; G11B 5/596
[52] U.S. Cl. ..................... 360/77.12; 360/77.01; 360/77.04
[58] Field of Search ............. 360/77.12, 77.13, 77.14, 360/77.15, 77.01, 75, 78.01, 77.04, 77.07, 77.08

[56] References Cited

U.S. PATENT DOCUMENTS

| | | | |
|---|---|---|---|
| 3,164,682 | 8/1959 | Anderson | 360/121 |
| 3,402,463 | 9/1968 | Bos et al. | 29/603 |
| 3,718,776 | 2/1973 | Bate et al. | 360/119 |
| 3,813,693 | 5/1974 | Gooch et al. | 360/119 |
| 4,149,198 | 4/1979 | Behr et al. | 360/77.07 |
| 4,291,354 | 9/1981 | Chase | 360/129 |
| 4,313,143 | 1/1982 | Zarr | 360/106 |
| 4,322,764 | 3/1982 | Tanaka | 360/129 |
| 4,422,111 | 12/1983 | Moeller et al. | 360/72.1 |
| 4,426,665 | 1/1984 | Bradford et al. | 360/10.2 |
| 4,462,053 | 7/1984 | Lum et al. | 360/78.06 |
| 4,472,750 | 9/1984 | Klumpp et al. | 360/78.01 |
| 4,498,129 | 2/1985 | Velazquez | 364/174 |
| 4,530,019 | 7/1985 | Penniman | 360/77.08 |
| 4,542,428 | 9/1985 | Yanagi | 360/75 |
| 4,581,663 | 4/1986 | Tanaka | 360/77.12 |
| 4,586,094 | 4/1986 | Chambors et al. | 360/77.42 |
| 4,647,85 | 3/1987 | Irwin et al. | 360/85 |
| 4,695,909 | 9/1987 | Momata et al. | 360/122 |
| 4,750,067 | 6/1988 | Gerfast | 360/106 |
| 4,797,757 | 1/1989 | Haitani | 360/77.08 |
| 4,903,151 | 2/1990 | Mizukami et al. | 360/78.01 |
| 4,975,791 | 12/1990 | Eggebeen | 360/77.01 |
| 4,979,051 | 12/1990 | Eggebeen | 360/21 |
| 5,008,765 | 4/1991 | Youngquist | 360/77.12 |
| 5,014,139 | 5/1991 | Miyashita | 360/78.14 |
| 5,121,270 | 6/1992 | Alcudia et al. | 360/77.01 |

OTHER PUBLICATIONS

Irwin Magnetics, Specification, "Serial Recorded Magnetic Tape—Mini Data Cartridge for Information Interchange" dated Jun. 13, 1988, No. 6000340SP.

IBM Technical Disclosure Bulletin, "Re-Recordable Servo System for Multi-Track Tape", T. Schwarz, vol. 25, No. 2, (Jul. 1982), pp. 778–779.

IBM Technical Disclosure Bulletin, "Servo Control of Multielement Magnetic Heads", V. Zimmermann and R. Zuehlke, vol. 15, No. 4, (Sep. 1972), pp. 1320–1321.

IBM Technical Disclosure Bulletin, "Interleaved Multielement Magnetic Heads", T. Stenning, vol. 14, No. 7, (Dec. 1971), p. 2129.

*Primary Examiner*—Aristotelis Psitos
*Assistant Examiner*—Varsha A. Kapadia
*Attorney, Agent, or Firm*—Gary L. Griswold; Walter N. Kirn; Eric D. Levinson

[57] ABSTRACT

This invention relates to a magnetic recording head assembly and method enabling an end user to record a unique servo control track on a magnetic recording tape while the tape is in the recorder to be used for recording and playback of computer data. Previously, most such control tracks were applied only at the time of manufacture of preformatted media. The head assembly includes, in addition to a plurality of sets of read/write transducers, a servo write head having an extended transverse width for uniformly recording a servo signal across the width of a servo track section, and a servo erase head having a plurality of alternating erasing and non-erasing sections adapted to controllably erase portions of the previously recorded servo signal, resulting in unique servo control tracks.

4 Claims, 6 Drawing Sheets

SERVO POSITIONING SYSTEM FOR MAGNETIC RECORDING MEDIA

CROSS REFERENCE TO RELATED APPLICATION

This is a continuation of application Ser. No. 07/741,677 filed Aug. 7, 1991 now abandoned, which is a division of U.S. patent application Ser. No. 07/712,346, filed Jun. 7, 1991, assigned to the assignee of this application, U.S. Pat. No. 5,229,895.

BACKGROUND OF THE INVENTION

1. Field of the Invention

The present invention relates to servo information to control the transverse position of plurality of read/write transducers for multi-channel recording and playback of data.

2. Description of the Prior Art

It is very common to provide magnetic recording head assemblies having a plurality of recording/playback transducers positioned transverse to the intended path of a magnetic recording medium for writing data on and reading data from parallel tracks on the medium. It is also well known to include servo information on at least some of the tracks to enable control of the lateral position of the head assembly, thereby dynamically maintaining the respective transducers of the assembly centered on a respective track. The track widths can then be made significantly narrower, and the areal density of recording similarly increased.

A number of techniques for providing the servo information-containing tracks have been previously employed, each technique having certain attributes and certain deficiencies. Thus, for example, it is known to provide dedicated servo tracks on the medium at the time of manufacture. Such a technique, of course, prevents an end user from writing the servo information on an unformatted medium, and may result in unacceptable inaccuracies depending upon the variability of transducer spacings in various drives.

Accordingly, it is desirable to enable an end user to write the servo pattern on the medium while it is in the recorder/drive. An end user may then preformat, i.e., add the servo information to either a blank medium or utilize a medium which was either intentionally or unintentionally erased. Previously-known methods available to the user have included the use of a dedicated drive for servo recording only. Such a method is generally unacceptable due to the cost and inconvenience, particularly to users of small systems where only one drive can be afforded. Other methods require the drive to include a separate auxiliary head, which adds complexity to the drive, is a significant additional cost, and cannot probably be done within typical space envelopes of most drives.

One technique for providing the servo tracks by way of a separate, auxiliary head is disclosed in U.S. Pat. No. 4,979,051 (Eggebeen). The head assembly there depicted is primarily intended for use with multi-layer magnetic recording tape in which the servo information is buried, i.e., recorded on an underlying, high-coercive force layer, while actual user data is recorded directly thereover in an upper layer having a lower coercive force. The head assembly is shown to include two components: a first servo write transducer having a write face which extends the full width of the magnetic recording tape with which it is to be used, and a second servo write transducer which is spaced from the first and has a write face of the same overall width, but which contains a plurality of alternating contact and non-contact portions. A second servo signal is to be applied to the contact portions so as to continuously write that signal over the first servo signal.

SUMMARY OF THE INVENTION

In contrast to any of the techniques previously employed, and, in particular, to avoid the need for a buried servo approach as envisioned in the '051 patent acknowledged above, the present invention is directed to a servo signal written by a multi-channel head assembly for writing information on and reading information from a plurality of tracks along a magnetic medium, in which the assembly comprises a support base, and connected to the support base, a servo write transducer, a servo erase transducer, and longitudinally displaced from the servo write transducer, a plurality of sets of read/write transducers.

The servo write transducer has a write face with a first predetermined width (W1) for writing a servo signal extending substantially uniformly over a designated servo section along the medium, the width of the servo section thereby substantially corresponding in width to said first predetermined width.

The servo erase transducer has an erase face including a plurality of alternating erasing and non-erasing portions, the total width of said erase face substantially corresponding to said first predetermined width (W1), and with each of the erasing portions having a second predetermined width (W2) for enabling at least one of the erasing portions to erase a portion of the servo signal. Distinguishable transitions between the erased and remaining portions of the servo signal are thus provided which define at least one servo track extending along the servo section.

The plurality of sets of read/write transducers are each transversely separated from an adjacent set of read/write transducers by a distance equal to an integral multiple of the first predetermined width. Also, each transducer within the respective sets has a read/write face with a transverse gap width corresponding to the second predetermined width (W2) for writing on and reading from said medium a plurality of data tracks, each of which data tracks substantially corresponds in width to the second predetermined width and extends along a plurality of data sections having a width equal to the first predetermined width and abutting each other and the servo section.

The head assembly is particularly useful, as after the servo signal is written and partially erased to provide the distinguishable transitions, the head assembly may be transversely moved relative to the direction of travel of the medium a distance equal to an integral multiple of the first predetermined width to enable one of the read/write transducers to access a given servo track in the servo section. When so positioned, the other read/write transducers are automatically positioned to access given data tracks in the data sections. The head assembly may then be subsequently dynamically repositioned in response to the distinguishable transitions played back from the given servo track to maintain a predetermined response to the transitions, thereby enabling each of the other read/write transducers to be maintained centered along a respective data track in a corresponding data section.

In another embodiment, the present invention may be produced by a system for writing at least one track of dedicated servo information within a servo section extending along a magnetic recording medium, thereby enabling immediate writing and reading of data on at least one data track in a plurality of adjacent data sections under control of servo information read back from the servo track. This system comprises a head assembly including a servo write transducer and a servo erase transducer. The servo write transducer has a write face with a first predetermined width (W1), while the servo erase transducer is longitudinally displaced from the servo write transducer, and has an erase face which includes a plurality of alternating erasing and non-erasing portions, the total width of said erase face substantially corresponding to the first predetermined width (W1), and in which each of the erasing portions has a second predetermined width (W2) separated from an adjacent erasing portion a distance equal to said second predetermined width (W2).

The system further comprises means for applying a servo signal to the servo write transducer, so as to write the servo signal on the medium, extending substantially continuously over the designated servo section. The width of the servo section thereby substantially corresponds in width to the first predetermined width.

Means are also included for applying periodic bursts of an erase signal to the alternating erasing portions of the servo erase transducer to periodically erase a portion of the servo signal along at least one zone extending along said servo section. This produces distinguishable transitions between the periodically erased zones and adjacent continuously written zones, which transitions define at least one servo track extending along said servo section.

In a preferred embodiment of this system, the outer edges of the two outermost erasing portions are inwardly offset from the edges of the servo section one-half of the second predetermined width, such that the resultant distinguishable transitions defining the center lines of each said servo track are integral multiples of the first predetermined width from a corresponding data track within each of the data sections.

DETAILED DESCRIPTION OF THE PREFERRED EMBODIMENT

Figure 1:
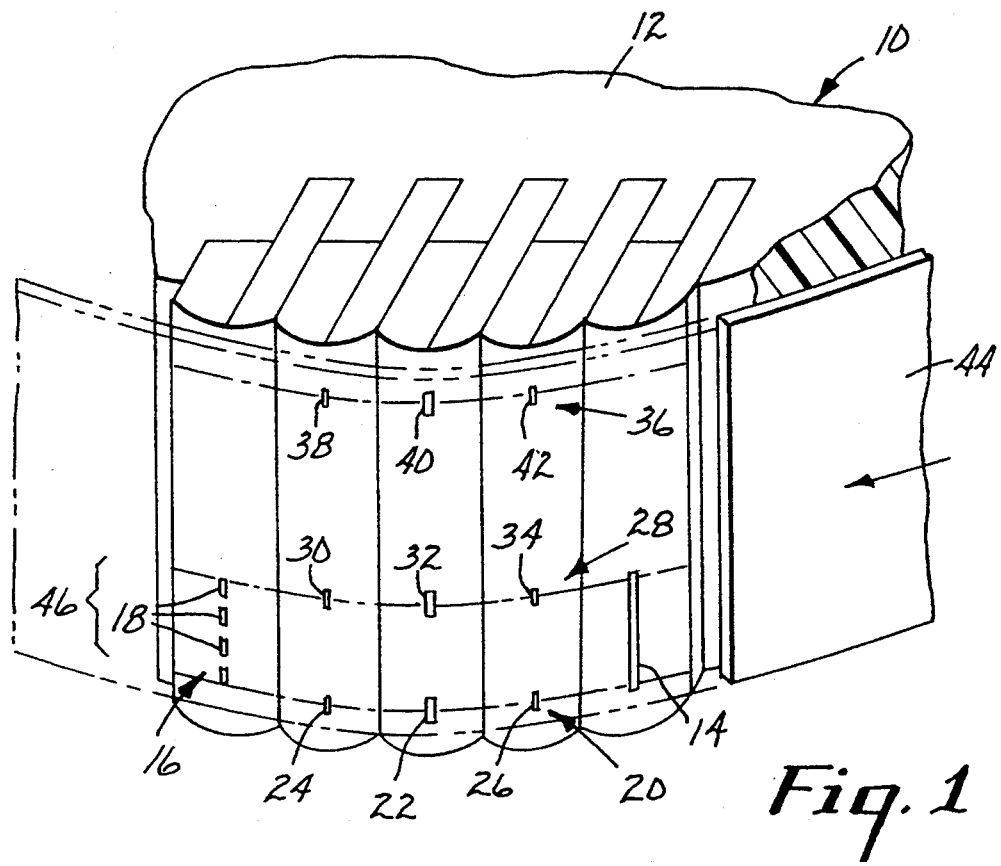
FIG. 1 is an isometric view of a magnetic head assembly useful with the present invention.

As noted above, FIG. 1 is a partially cut-away isometric view of the head assembly 10 of the present invention. As there is seen, a assembly 10 includes a support base 12 within which are mounted a plurality of transducers. Of particular interest to the present invention is a servo write transducer 14 and a servo erase transducer 16. The servo write transducer 14 has an extended transverse gap width (W1) equal to the width useful with a desired servo section. Such a section, as is described in more detail hereinafter, may typically contain a plurality of servo tracks, each having a width (W2). In contrast, the servo erase transducer 16, while having a total width equal to that of first transducer 14 (i.e., W1), is divided into sections 18, with each section 18 being equal to the width of one of the desired servo tracks (W2), each of the sections 18 being separated from the adjacent section by a similar width (W2).

The head assembly further includes a plurality of read and/or write transducers. These transducers are connected to the support base 12, and, in the preferred embodiment shown in FIG. 1, include three sets 20, 28, and 36 of read-write-read transducers, each set being spaced apart from an adjacent set by a distance equal to an integral multiple of the transverse width (W1) of the aforementioned servo section established by the width of the first servo write transducer 14. Thus, the first set 20 includes a centermost located write transducer 22 and, located on either side thereof, read transducers 24 and 26. The first set of heads 20 is positioned in line with the lower edge of the first servo write transducer 14, such that the read transducers 24 and 26 will automatically be positioned to read the servo track at the lower edge of the servo section. Similarly, the second set 28 of read/write transducers 30, 32, and 34, respectively, is positioned in transverse alignment with the first set, but spaced away therefrom a distance equal to the width of the servo section. Accordingly, those transducers will be positioned to read corresponding data tracks within an adjacent section of data tracks. Finally, the third set 36 of read/write transducers 38, 40, and 42, respectively, is located in transverse alignment with the respective transducers of the first and second sets, but is spaced transversely from the second set, a distance equal to two times the width of the servo section.

The manner in which such variously-spaced transducers are utilized to read data tracks within respective sections is disclosed in U.S. Pat. No. 5,008,765, and will be discussed in more detail hereinafter. In any event, a magnetic tape 44, passing along a transport path adjacent the head assembly may, in the first instance, pass in the direction of the arrow from right to left, such that a servo track extending the width of the entire servo section is first recorded by the servo write transducer 14 and, is subsequent partially erased by the servo erase transducer 16. The resultant servo tracks may thereafter be played back by the respective read transducers in one of the sets of transducers, while data is being recorded and/or played back by the read/write transducers of the other sets of transducers. The use of two read transducers in each set enables data retrieval in either direction of tape travel. The magnetic gaps of all of the respective transducers, whether they be provided for recording, playing back, or erasing, are in each case orthogonal to the direction of the travel of the media and in substantially the same plane as the media.

Figure 2:
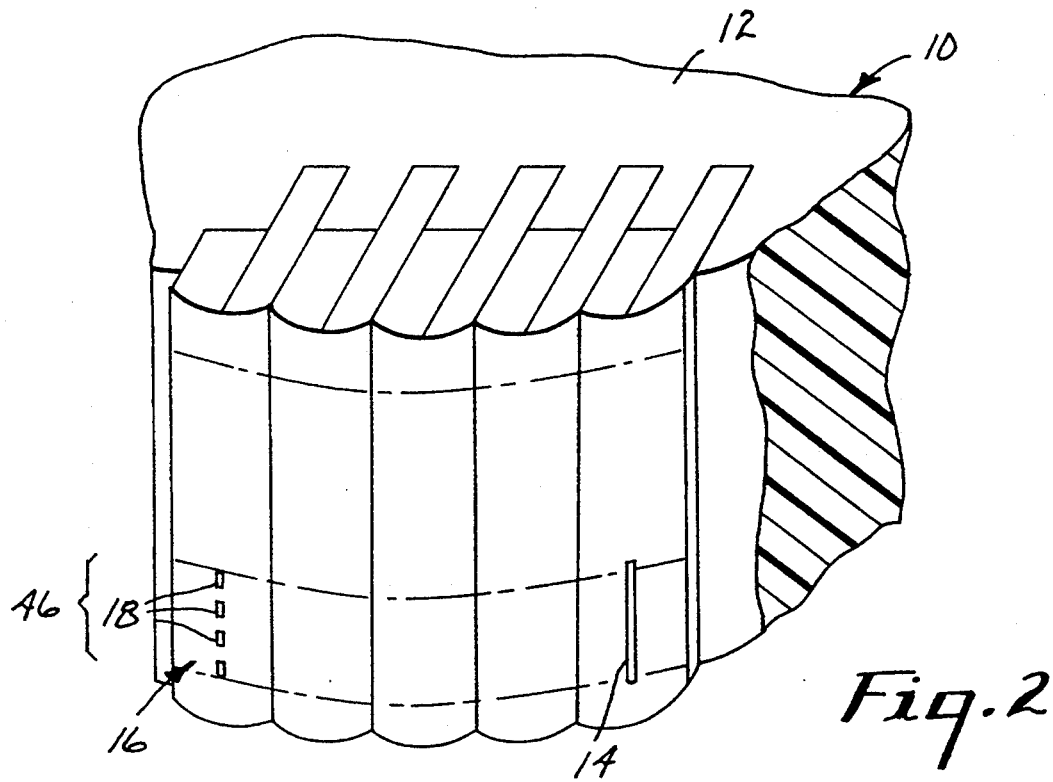
FIG. 2 is an isometric view of the head assembly of FIG. 1, showing the placement of only those transducers used to record the servo tracks within a designated servo section.

As is shown in greater clarity in FIG. 2, the servo write transducer 14 can write a pattern having a first predetermined width (W1), which is the width of the respective servo section. Specifically, the servo write transducer 14 is preferably energized with a high-frequency drive signal so as to uniformly record only that signal pattern throughout the width of the servo section. Subsequently, as the medium 44 passes the servo erase transducer 16, the erasing portions 18 erase respective stripes from the previously continuously-recorded signal pattern. These erased stripes correspond to the width (W2) of each of the erasing portions 18. Preferably, the erasure is provided by applying a high frequency signal to the servo erase transducer 16. The frequency of that pattern is much higher than can be recorded and played back and thereby erases the written pattern.

Also, the servo write erase transducer 16 is preferably switched on and off at a rate which is a submultiple of the servo write frequency, such that effective erasure only occurs while the servo erase transducer 16 is presented with a gated-on signal. The total result of the servo pattern produced by the combined actions of the servo transducers 14 and 16 is a pattern having a substantial checkerboard-like configuration as shown in more detail in FIG. 4.

It may further be noted in FIG. 2 that the alternating erasing and non-erasing portions of the servo erase transducer 16 are transversely situated so as to leave a continuous one-half track width (W2/2) portion of the recorded servo signal along both edges of the servo section.

Figure 3:
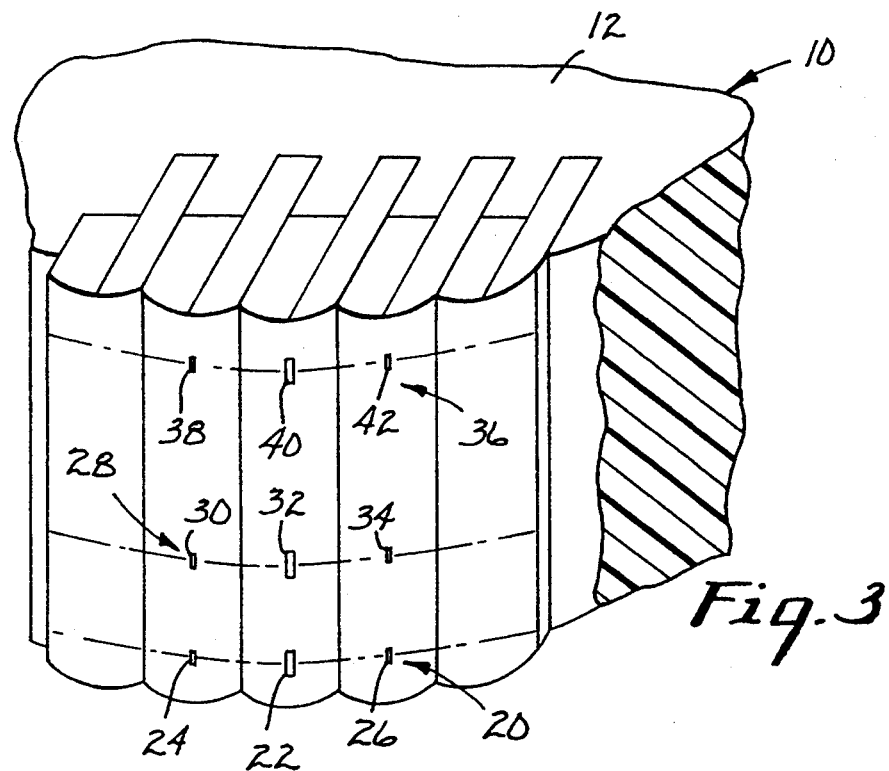
FIG. 3 is an isometric view of the head assembly of FIG. 1, showing the placement of only those transducers used for reading and writing data on data tracks within designated data sections.

The respective sets of read and write transducers 20, 28, and 36 are shown in more detail in FIG. 3. As may there be noted, the respective read and write transducers of each respective set are positioned along a common center line so as to record and read data along a track centered about that center line. The respective write transducers 22, 32, and 40 have a width (W2) slightly wider than that of the respective read transducers 24, 26, 30, 34, 38, and 42. This variation in width is typically done to accommodate transverse shifting of the recording medium without loss in the signal output produced by the read transducers. As discussed in more detail hereinafter with respect to FIG. 7, an advantage of the head assembly 10 and the servo mechanism utilized with it is that the width of the read transducers may now be considerably wider than previously, and, for a given minimally-acceptable width, now allow a significantly greater transverse track density, i.e., significantly narrower tracks without loss in the playback signal amplitude.

Figure 4:
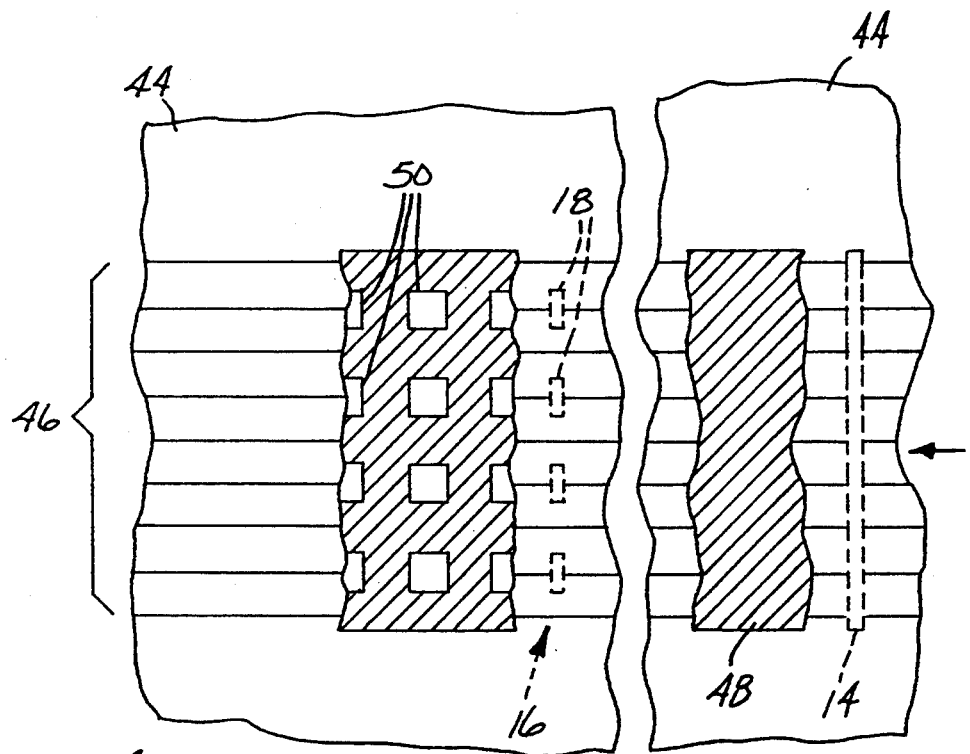
FIG. 4 is a conceptual view of the servo write and erase transducers of the head assembly of FIG. 1 and the resultant recorded servo tracks.

The manner in which the servo tracks are recorded within a servo section 46 of the magnetic recording tape 44 is set forth in more detail in the conceptual view of FIG. 4, where the resultant recorded patterns are shown adjacent the associated write and erase transducers 14 and 16, respectively. The action of the servo write transducer 14 produces a continuously-recorded pattern 48 which extends uniformly from one edge to the other edge of the servo section 46. Next, the servo erase transducer 16, being made up of the four subsections 18, periodically erases portions 50 of the previously continuously-recorded signals.

As was previously noted, each of the sections 18 are one track wide and are offset from the desired tracks by one-half track width. Thus, within track 1, for example, there is established a center line along which a transition between the continuously recorded patterns and the erased portions exists. A similar transition along a center line exists for track 2, albeit of opposite polarity, The same alternating polarity situation exists for tracks 3 through 8.

Figure 5:
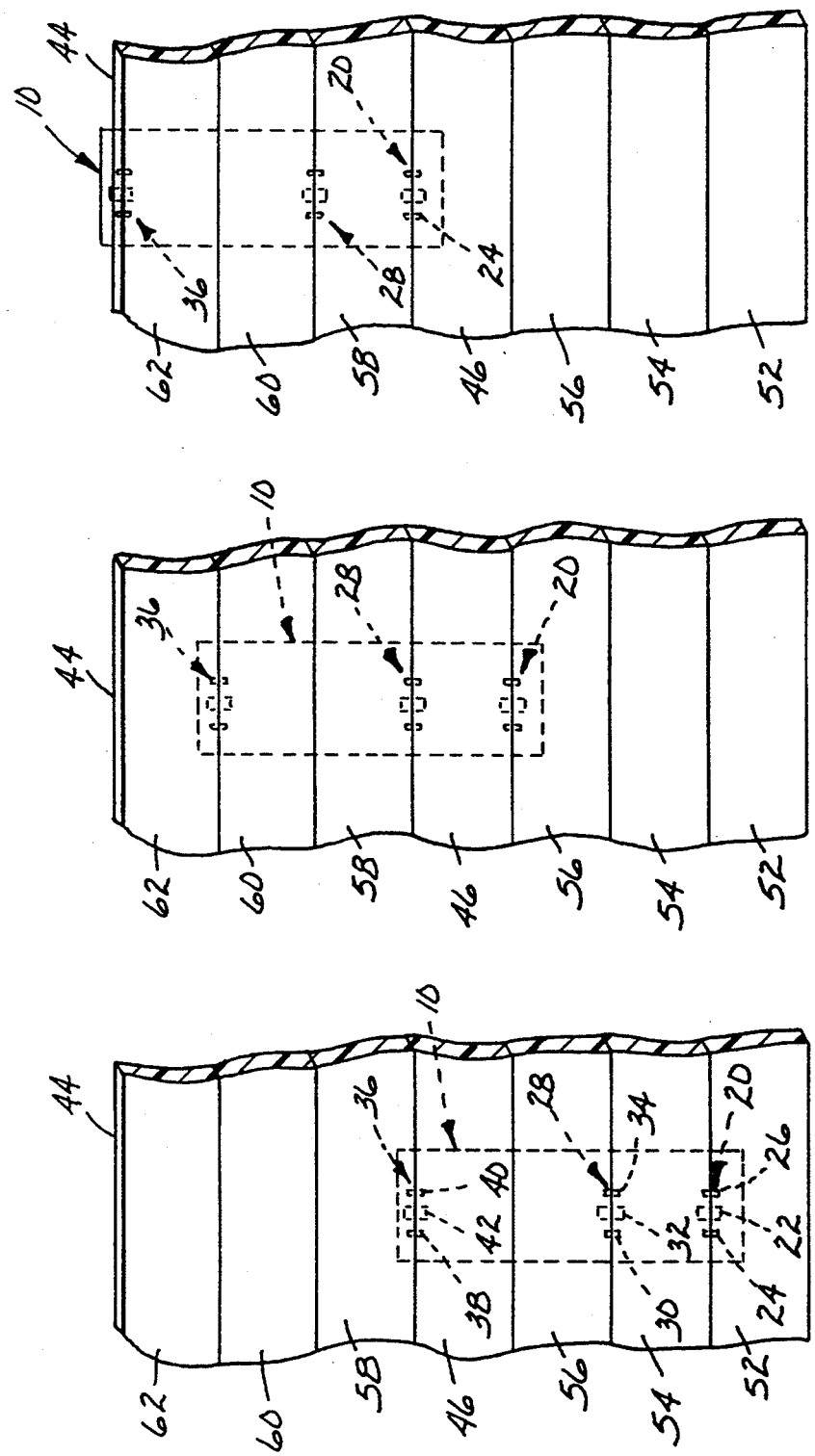
FIGS. 5A, 5B, and 5C are successive views showing the same servo section and six data sections, but in which the head assembly is differently positioned in each view such that one set of data transducers is always in position to read one track of the servo data while the other two sets are positioned to each read or write tracks in the data sections.

Referring now to FIGS. 5A, 5B, and 5C, it may be seen that the magnetic recording tape 44 is preferably configured with seven sections within each of which tracks of servo and/or user-related data may be recorded and played back. Thus, the centermost section 46 may be seen to have recorded thereacross eight tracks of servo data, while on either side there are three sections 52, 54, 56, 58, 60, and 62 within each of which may be recorded and played back eight tracks of user-related data.

In FIG. 5A, it may be seen that the data transducer set 36 is positioned along the upper edge of the servo section so as to play back the uppermost servo track within that section. Accordingly, the read transducer 38 of that set is used in the forward direction of tape movement to playback the servo track while the opposite read transducer 42 is used to play back the servo data while the tape is moving in the opposite direction. Additionally, during write operations, the output of both read transducers 38 and 42 are averaged to provide a servo signal corrected for azimuthal errors between the tape and head assembly.

The set 36 is laterally positioned so as to successively read the full width servo recording followed by the periodic bursts of half-signal intensity due to the erased portions 50, so long as the head assembly is positioned with the appropriate read transducer centered along the center line of a given servo track. The resultant output signal of the read transducers is a burst of signal of full amplitude while over the recorded servo information 48, followed by a burst of half signal amplitude, while over the portion 50 in which half of the signal has been erased. So long as the respective center lines of the read transducers are exactly over a respective edge of the erased portions, one-half of the gap of the playback transducers will see a recorded signal while the lower half will not respond to the erased portions. The amplitude of signal bursts out of the transducers will, thus, be exactly two to one when the transducer is correctly positioned at the center line of each of the respective servo tracks. However, as the medium 44 moves transversely due to undesirable effects of edge slitting tolerances, imperfect positioning of the head assembly, etc., the ratio of amplitude bursts will change, this in turn providing an error signal which may be used to reposition the magnetic head assembly 10 by means of the aforementioned servo mechanism as discussed in more detail hereinafter.

As shown in the subsequent FIGS. 5B and 5C, the head assembly 10 of the present invention may be variously positioned so that either the set of transducers 28 are positioned within the servo section as in FIG. 5B, or so that the third set 20 of transducers is positioned within the servo section as shown in FIG. 5C. It will be readily apparent that as each of those respective sets of transducers are so positioned, that the remaining sets are appropriately positioned to record and playback data from the data-containing track sections 52 through 62. It may there also be appreciated that if the entire head assembly 10 is stepped down one increment of track width, the data read transducer will read the lower half of an erased portion and the full width recorded signal so as to maintain the head assembly to be centered on track 2 of all of the respective sections. A similar situation as noted will apply to tracks 3 through 8.

Figure 6:
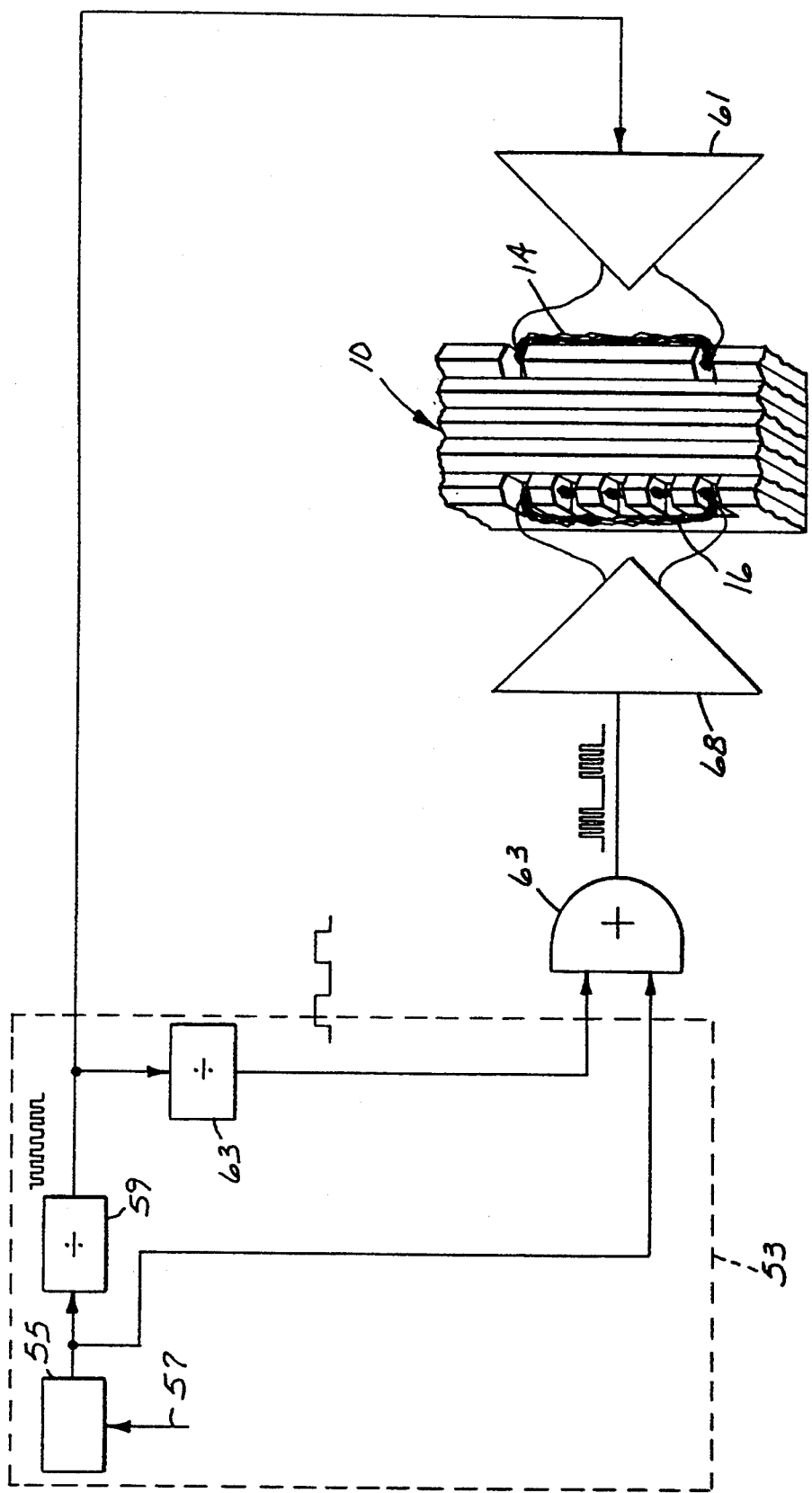
FIG. 6 is a schematic diagram of the servo write subsystem, including the servo write and erase transducers of the head assembly of FIG. 1.

FIG. 6 illustrates schematically the circuit for writing the continuous servo pattern 48 and for erasing the subsequent periodic bursts 50 as shown in FIG. 4. As shown in FIG. 6, this circuitry 53 includes an oscillator 55 which generates a basic clock frequency of 6 MHz. In response to a write-enable command at terminal 57, a signal is provided through the divider 59 to provide a signal of 400 kHz, which drives a servo write amplifier 61. The output of the amplifier 61 is coupled to the servo write transducer 14 of the magnetic head assembly 10.

The output from the oscillator 55 is similarly coupled directly to an AND gate 63, together with a further divided output at 10 kHz from a second divider 64. The resultant output from the AND gate 63 is a gated burst of high-frequency signals which is applied to an erase amplifier 68. The output thereof is applied to the servo erase transducer 16.

There are situations, particularly when recording long wavelength information, when the magnetic field recorded in the media extends beyond the width of the write transducer. This phenomena is commonly referred to as fringing and is usually undesirable. Depending on how severe the problem, this fringing effect may interfere with recording on adjacent tracks. The present invention accounts for such an eventuality. If the variables of wavelength, speed and magnetic field strength cause a fringing problem, the magnetic head assembly 10 can be positioned, for instance as in FIG. 5B. In this position, the output of the data read transducers 30 and 34 can be averaged to provide the lateral head assembly positioning servo information while the data write transducer 32 is positioned along the lower edge of the servo section 46 to erase any fringing magnetic flux recorded as a result of an earlier servo writing pass. If the magnetic head assembly 10 is stepped up a distance (W2), it can be seen how using the outputs of the data read transducers 24 and 26 can be averaged to provide servo information to position the data write transducer 32 such that it can effectively erase the fringe fields along the upper edge of the servo section.

Figure 7:
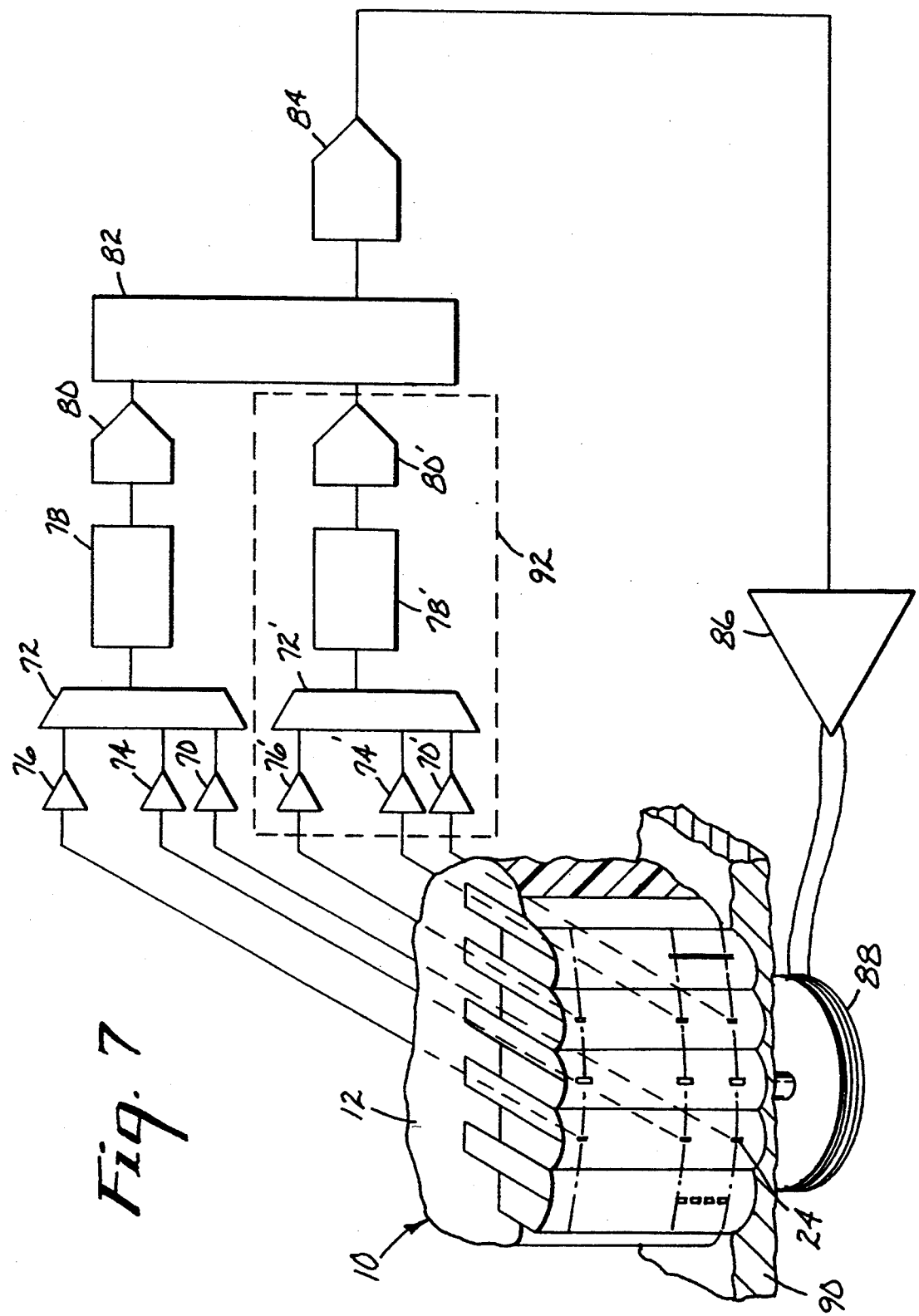
FIG. 7 is a schematic diagram showing the closed loop, head assembly positioning servo system used to locate and follow previously written servo tracks.

FIG. 7 illustrates schematically the entire closed loop lateral head assembly positioning servo system in the playback mode. With the magnetic head assembly 10 positioned as shown in FIG. 5C, the output of the data read transducer 24 (assuming forward motion of the media) is presented to the multiplexer 72 via the preamp 70. It is this signal of alternating bursts of full amplitude and, nominally, one-half amplitude that are selected for servo control.

The servo information is then processed through a filter and demodulator 78, analog to digital converter 80, and digital signal processor 82 in order to compute the resultant position error signal. This position error signal is then sent through the driver module 84 to power amplifier 86, causing the lateral head assembly positioning actuator 88 to move the head assembly support structure 90, thereby repositioning the magnetic head assembly 10 such that the appropriate read transducer is centered over the center line of a respective servo track. It should be evident from FIG. 7 that the components of the servo mechanism contained in the block 92 are exactly the same as the elements above them and are used when the media is moving in the reverse direction.

The details of the servo mechanism themselves are well known to those skilled in the art and are not part of the invention claimed herein.

When originally positioning the head assembly transversely for purposes of recording the servo track within the servo band on previously unrecorded media, traditional edge seeking methods, such as those disclosed in U.S. Pat. No. 4,422,111 (Moeller and Wolff) and transverse positioning methods, such as disclosed in U.S. Pat. No. 4,313,143 (Zarr), may be utilized.

Figure 8:
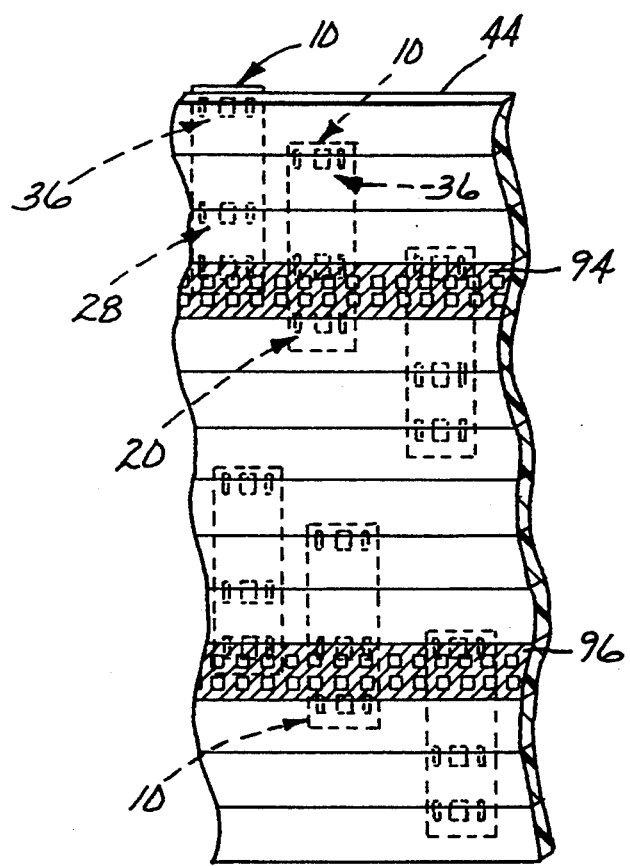
FIG. 8 is a view of an alternative system configuration as it would be recorded on media.

An alternate configuration for placing the servo information according to the present invention is set forth in FIG. 8. As may there be seen, the previously-described servo section 46, within which are positioned eight servo tracks, may be split into two components such that there are two servo subsections 94 and 96, each section containing four servo tracks. Associated with the two servo sections 94 and 96 will then be 12 sections, each containing four data tracks. Other combinations with more or fewer servo tracks, or more than two servo sections within the respective data sections and corresponding to more or fewer data tracks, can similarly be envisioned and are within the scope of the present invention.

What we claim is:

1. A servo positioning system, comprising:
   (a) a magnetic recording medium having a designated servo section on the medium;
   (b) a magnetically recorded servo signal on the servo section of the medium, wherein the servo signal has a length and a width perpendicular thereto which has distinguishable transitions between periodically erased zones and adjacent continuously written zones;
   (c) a magnetic head comprising a first transducer which acts as a data transducer and second and third transducers which act as servo read transducers, wherein the third transducer is longitudinally spaced apart from the second transducer along the length of the servo signal, wherein the second and third transducers each generate first signal bursts in response to the periodically erased zones and second signal bursts in response to the continuously written zones;
   (d) means of generating a first error signal from the second transducer and a second error signal from the third transducer by comparing (1) a ratio of amplitudes of the first and second signal bursts with (2) a fixed ratio of the amplitudes as determined when the second and third transducers are correctly positioned on the servo section;
   (e) means for generating a third error signal by averaging the first and second error signals; and
   (f) means responsive to the third error signal for repositioning the first transducer, whereby the first transducer is centered along a given data track on the recording medium.

2. The system of claim 1, wherein the magnetic recording medium is magnetic recording tape.

3. The system of claim 1, wherein the second and third transducers are transversely displaced across the magnetic head from the first transducer.

4. The system of claim 1, wherein the fixed ratio is 1:2.

* * * * *